(12) United States Patent
Dumitrescu et al.

(10) Patent No.: US 8,526,044 B2
(45) Date of Patent: Sep. 3, 2013

(54) TEMPLATE-BASED INSTALLATION OF WORKFLOW SYSTEMS IN A PRINT SHOP ENVIRONMENT

(75) Inventors: Tiberiu Dumitrescu, Simi Valley, CA (US); Daniel Hufnagel, Williamson, NY (US); Yukikazu Mori, Tokyo (JP); Michael Raines, Austin, TX (US)

(73) Assignee: Ricoh Company, Ltd, Tokyo (JP)

( * ) Notice: Subject to any disclaimer, the term of this patent is extended or adjusted under 35 U.S.C. 154(b) by 0 days.

(21) Appl. No.: 13/077,265

(22) Filed: Mar. 31, 2011

(65) Prior Publication Data

US 2012/0250075 A1    Oct. 4, 2012

(51) Int. Cl.
- *G06F 3/12*   (2006.01)
- *G06F 15/16*   (2006.01)
- *G01D 9/42*   (2006.01)

(52) U.S. Cl.
USPC ......... 358/1.15; 358/1.1; 709/247; 346/107.3

(58) Field of Classification Search
None
See application file for complete search history.

(56) References Cited

U.S. PATENT DOCUMENTS

| | | | |
|---|---|---|---|
| 6,573,910 B1 | 6/2003 | Duke et al. | |
| 6,825,943 B1 | 11/2004 | Barry et al. | |
| 7,051,328 B2 | 5/2006 | Rai et al. | |
| 7,065,567 B1 | 6/2006 | Squires et al. | |
| 7,079,266 B1 | 7/2006 | Rai et al. | |
| 7,099,027 B1 | 8/2006 | Barry et al. | |
| 7,125,179 B1 | 10/2006 | Rai et al. | |
| 7,148,985 B2 | 12/2006 | Christodoulou et al. | |
| 7,558,638 B2 | 7/2009 | Chang et al. | |
| 7,626,717 B2 | 12/2009 | Rai et al. | |
| 8,120,801 B2 | 2/2012 | Zhang et al. | |
| 8,259,321 B2 | 9/2012 | Zhang et al. | |
| 8,284,423 B2 | 10/2012 | Jahn et al. | |
| 8,427,670 B2 | 4/2013 | Rai | |
| 2002/0071134 A1 | 6/2002 | Jackson | |
| 2003/0041765 A1* | 3/2003 | Hill | 101/484 |
| 2003/0061178 A1* | 3/2003 | Ogawa | 705/408 |
| 2003/0177082 A1 | 9/2003 | Buckwalter | |
| 2003/0212611 A1 | 11/2003 | Barrot et al. | |
| 2004/0006522 A1 | 1/2004 | Keane | |
| 2004/0068424 A1* | 4/2004 | Lee et al. | 705/7 |
| 2004/0111430 A1 | 6/2004 | Hertling | |
| 2004/0184061 A1 | 9/2004 | Christiansen | |
| 2004/0196470 A1 | 10/2004 | Christiansen | |
| 2004/0196493 A1 | 10/2004 | Christiansen | |
| 2005/0065830 A1* | 3/2005 | Duke et al. | 705/7 |
| 2005/0096770 A1 | 5/2005 | Chua et al. | |

(Continued)

*Primary Examiner* — King Poon
*Assistant Examiner* — Marcus T Riley
(74) *Attorney, Agent, or Firm* — Duft Bornsen & Fettig, LLP

(57) ABSTRACT

Systems and methods are provided for installing workflow servers for a print shop. One embodiment is a system that installs a workflow server for a print shop. The system accesses installation templates, configured for different categories of print shop, that describe a set of print shop resources expected to exist at the category of print shop. The system also installs workflow server software on a computer system of a print shop. During the installation, the system determines a category for the print shop, selects an installation template that matches the category of the print shop, and performs a dialogue of queries with a user to determine which resources of the set of print shop resources identified by the installation template are available to the print shop, wherein the dialogue excludes queries for print shop resources that are not in the set of print shop resources described by the installation template.

20 Claims, 8 Drawing Sheets

(56) References Cited

U.S. PATENT DOCUMENTS

| | | |
|---|---|---|
| 2005/0151993 A1 | 7/2005 | Gartstein |
| 2005/0154625 A1 | 7/2005 | Chua et al. |
| 2005/0248804 A1 | 11/2005 | Goel et al. |
| 2005/0275875 A1 | 12/2005 | Jennings |
| 2006/0039026 A1 | 2/2006 | Lofthus et al. |
| 2006/0044597 A1 | 3/2006 | Dumitrescu et al. |
| 2006/0092467 A1 | 5/2006 | Dumitrescu et al. |
| 2006/0149755 A1 | 7/2006 | Marshall et al. |
| 2007/0070379 A1 | 3/2007 | Rai et al. |
| 2007/0091355 A1 | 4/2007 | Rai |
| 2007/0124182 A1 | 5/2007 | Rai |
| 2007/0177191 A1 | 8/2007 | Eschbach et al. |
| 2007/0185777 A1 | 8/2007 | Pyle et al. |
| 2007/0236708 A1 | 10/2007 | Jahn et al. |
| 2007/0242303 A1 | 10/2007 | Barry et al. |
| 2007/0247657 A1 | 10/2007 | Zhang et al. |
| 2007/0247659 A1 | 10/2007 | Zhang et al. |
| 2008/0137108 A1 | 6/2008 | Song et al. |
| 2008/0144080 A1 | 6/2008 | Randt |
| 2008/0180728 A1 | 7/2008 | Sekine |
| 2008/0256541 A1 | 10/2008 | Rai |
| 2008/0285067 A1 | 11/2008 | Rai |
| 2009/0043628 A1 | 2/2009 | Gombert |
| 2009/0063710 A1 * | 3/2009 | Sekine et al. .................. 710/1 |
| 2009/0063718 A1 | 3/2009 | Sekine et al. |
| 2009/0109464 A1 | 4/2009 | Knodt |
| 2009/0251721 A1 | 10/2009 | Knodt |
| 2009/0279123 A1 | 11/2009 | Sekine |
| 2009/0279124 A1 | 11/2009 | Liu et al. |
| 2009/0279125 A1 | 11/2009 | Liu et al. |
| 2009/0281862 A1 | 11/2009 | Conescu et al. |
| 2009/0282412 A1 | 11/2009 | Sekine |
| 2010/0060909 A1 | 3/2010 | Conescu et al. |
| 2010/0231968 A1 | 9/2010 | Hirasawa |
| 2010/0250267 A1 | 9/2010 | Brenner et al. |
| 2011/0075195 A1 | 3/2011 | Cain |
| 2011/0090529 A1 | 4/2011 | Hertling |
| 2011/0170893 A1 | 7/2011 | Nishikawa |
| 2011/0199646 A1 | 8/2011 | Homma |
| 2012/0057191 A1 | 3/2012 | Gnanasambandam |
| 2012/0092688 A1 | 4/2012 | Pangrazio |
| 2012/0188587 A1 | 7/2012 | Gaertner |
| 2012/0212771 A1 | 8/2012 | Goddard |

\* cited by examiner

TEMPLATE-BASED INSTALLATION OF WORKFLOW SYSTEMS IN A PRINT SHOP ENVIRONMENT

RELATED APPLICATIONS

This application incorporates by reference commonly owned U.S. patent application Ser. No. 13/036,160, filed Feb. 28, 2011, entitled "WORKFLOW GENERATION IN A PRINT SHOP ENVIRONMENT". This application also incorporates by reference commonly owned U.S. patent application Ser. No. 13/036,350, filed Feb. 28, 2011, entitled "JOB TICKET TRANSLATION IN A PRINT SHOP ARCHITECTURE". This application also incorporates by reference commonly owned U.S. patent application Ser. No. 13/036,147, filed Feb. 28, 2011, entitled "WORKFLOW REGENERATION IN A PRINT SHOP ENVIRONMENT". This application also incorporates by reference commonly owned U.S. patent application Ser. No. 13/036,379, filed Feb. 28, 2011, entitled "CUSTOMER-SPECIFIC SERVICES FOR JOB SUBMISSION IN A PRINT SHOP ARCHITECTURE". This application also incorporates by reference commonly owned U.S. patent application Ser. No. 13/070,732, filed Mar. 24, 2011, entitled "USER INTERFACES FOR RULE-BASED WORKFLOW GENERATION IN A PRINT SHOP ENVIRONMENT".

FIELD OF THE INVENTION

The invention relates to the field of print job management, and in particular, to systems for workflow generation in a print shop environment.

BACKGROUND

Print shops are typically medium or large scale facilities capable of supplying printing services to meet a variety of customer demands. For example, print shops are often used to print documents for mass-mailing (e.g., customer bills, advertisements, etc.). Because print shops engage in printing on a scale that is hard to match, their customer base is usually varied. Print shop customers may therefore include both large institutional clients (e.g., credit card companies and banks), and small customers (e.g., small businesses and churches).

Print shops are generally arranged to print incoming jobs from customers in a way that is economical, yet fast. Thus, print shops often include a number of high-volume printers capable of printing incoming jobs quickly and at high quality. Print shops also typically include post-printing devices that are used to process the printed documents of each job (e.g., stackers, staplers, cutters, binders, etc.). Print shops may also provide digital/web publishing, e-mail, or other multimedia services to customers. Because print shops serve a variety of customers, they are often tasked with processing jobs that have varying printing formats, delivery dates, and media requirements. Print shops therefore often use a centralized print server that coordinates activity between printers and other devices of the print shop.

Customers submit their print jobs to print shops in a variety of formats. Along with the print data itself, a print job may include a job ticket describing what the customer wants (e.g., deliverable products, deadlines, e-mail blasts, etc.). For example, a customer may request that the print shop publish the print data to a web page and receive three copies of a printed document made from the print data. Customers may communicate their requests for services to the print shop in different ways. For example, a customer may use a Web-to-Print application that generates an XML or JDF file for the print shop, or a customer may simply telephone a print shop operator to request print shop services.

As jobs are received at a print shop, each job ticket may include different services requested by different customers. To perform services requested by customers, a print shop performs a set of print shop activities. For example, to print a bound document, a print shop may engage in activities such as "pre-flight" review of print data, printing the document, post-print binding the document, physically shipping the document to the customer, and billing the customer. A customer's requested services can vary with each incoming job, and print shop devices and personnel perform different activities to process incoming jobs having different requested services. However, deciding the specific activities to perform for incoming print data is often a time consuming process.

In order to address this issue, operators of a print shop may use workflow systems that dictate an order of activities to perform for incoming jobs. These workflow systems define activities that are used to process different types of incoming print jobs. Unfortunately, workflow systems are often time-intensive because they require the generation and maintenance of many individual workflows that are each targeted to a specific type of print job. If a print job enters the print shop and does not match a predefined workflow, an error may occur and the workflow system may be unable to process the incoming job. Thus, these workflow systems may require a print operator to define workflows for each type of incoming print job that could potentially enter the print shop.

Installing a workflow system in a print shop environment is also a complicated and time consuming process, because each print shop is likely to use a different combination of software, hardware, and personnel to perform similar activities. For example, the activity of "print" may be performed with a desktop printer at one print shop, while "print" may be performed with a high-volume continuous-form printer at another print shop. The hardware, software, and personnel used to perform print shop activities may be referred to in general as print shop resources. Additionally, the various print shop resources may communicate with the print shop using different communication protocols, and may or may not be configured to report their capabilities to the print shop. Thus, installation programs for workflow systems often ask a print operator a large number of configuration questions in order to determine the types of print shop resources that exist at the shop, as well as the configuration of the resources at the print shop. The number of questions asked may be prohibitively time consuming (e.g., thousands of questions), and print operators therefore desire methods for reducing the time spent initializing workflow systems in a print shop environment.

SUMMARY

Embodiments described herein use templates to install a workflow system for a print shop. Each template is used to install the workflow system at a different category of print shop, and each category of print shops may serve a specific type of customer (such as educational printing, commercial printing, etc.). The installation templates describe print shop resources that are expected to exist at a category of print shop. Based upon these templates, an installer engages in an installation dialogue with a user that is used to determine the configuration of the print shop. When installed based upon the configuration of the print shop, the workflow system is operable to dynamically generate workflows of activities "on the fly" for incoming print jobs and to direct print shop resources to perform the activities in the workflows.

One embodiment is a system that installs a workflow server for a print shop. The system comprises installation templates and an installer. The installation templates are each configured for a different category of print shop, wherein each installation template describes a set of print shop resources expected to exist at a category of print shop. The installer is operable to install workflow server software on a computer system of a print shop. As part of the installation, the installer is further operable to determine a category for the print shop, select an installation template that matches the category of the print shop, and perform a dialogue of queries with a user to determine which resources of the set of print shop resources identified by the installation template are available to the print shop. The dialogue with the user excludes queries for print shop resources that are not in the set of print shop resources described by the installation template.

In one embodiment, the installer is further operable to determine the category for the print shop automatically by identifying the capabilities of the print shop. In a further embodiment, the installer is operable to determine the category for the print shop by providing the user multiple options for print shop categories, and receiving input indicating one of the options as the category for the print shop. In another embodiment, the installation templates are categorized based upon the customers served by a print shop. In yet another embodiment, the installer is further operable to perform the queries of the dialogue to determine whether each print shop resource described by the installation template is available to the print shop. In yet another embodiment, the installer is further operable to perform the queries of the dialogue to determine the communication protocols used by the print shop resources available to the print shop. In yet another embodiment, the installer is further operable to perform the queries of the dialogue to determine the configuration of each print shop resource available to the print shop.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
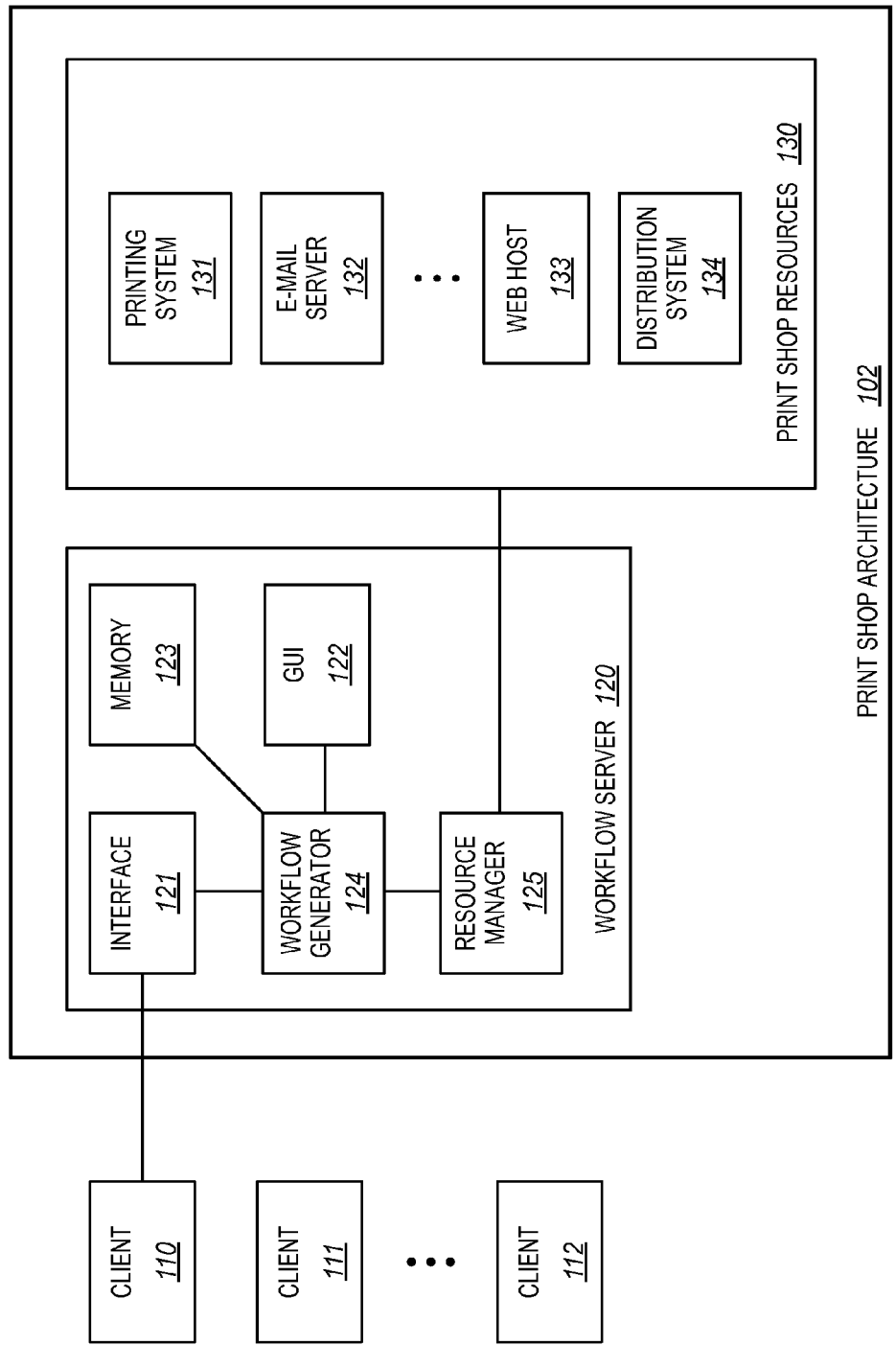
FIG. 1 is a block diagram illustrating a print shop architecture in an exemplary embodiment.
Figure 2:
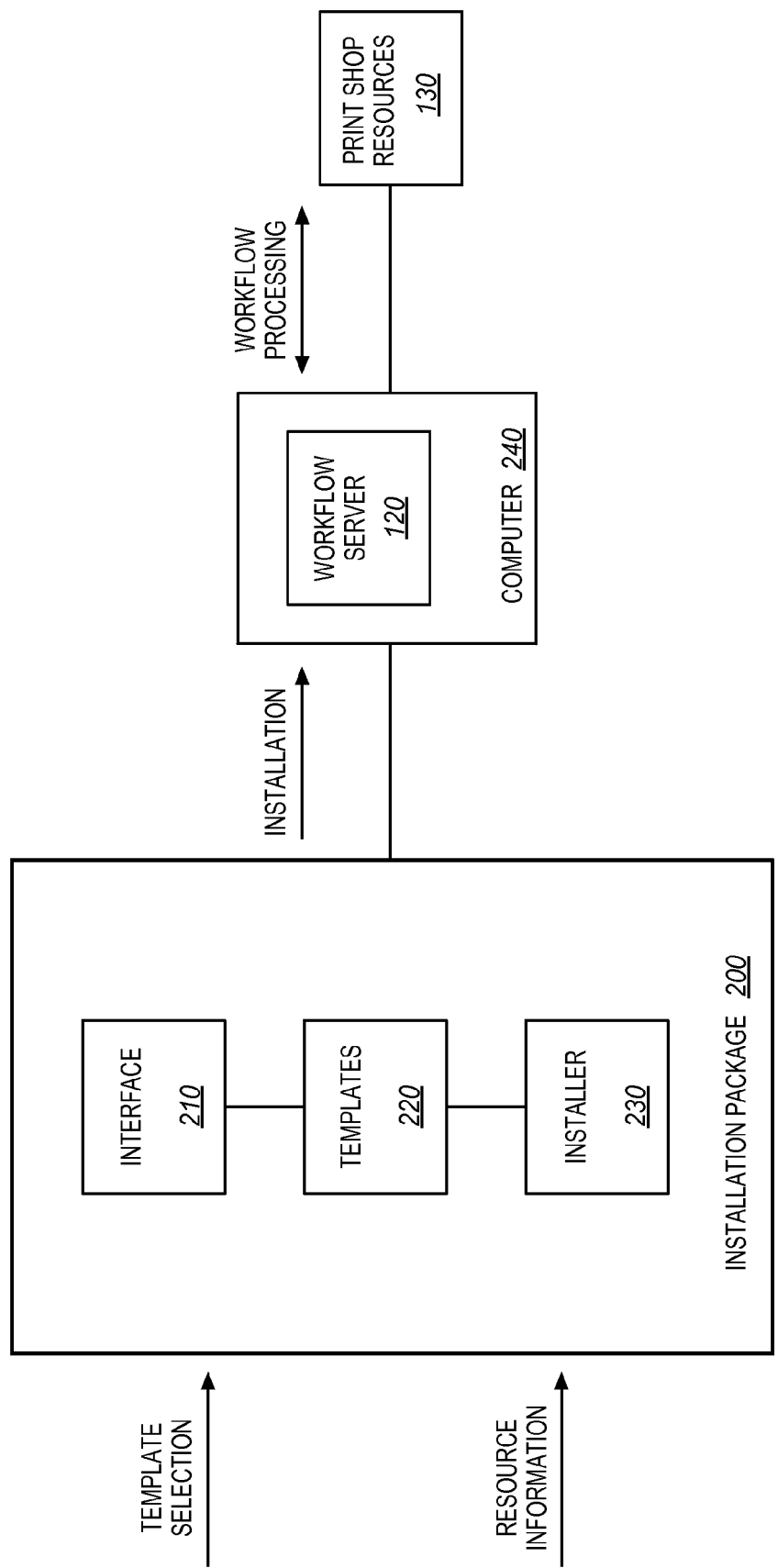
FIG. 2 is a block diagram illustrating an installation package in communication with a storage device and print shop resources in an exemplary embodiment.

The following discussion will start by describing a print shop workflow system in an exemplary embodiment in FIG. 1. Once the functions of the workflow system have been described with regard to FIG. 1, the discussion will shift its focus to an installation package capable of installing the workflow system of FIG. 1. The installation package, described with regard to FIG. 2, is capable of installing the workflow system using an installation template. The installation template describes the types of print shop resources that are expected to be used by the workflow system.

FIG. 1 is a block diagram illustrating a print shop architecture 102 in an exemplary embodiment. Print shop architecture 102 includes workflow server 120, which functionally connects one or more clients 110-112 to print shop resources 130. Clients 110-112 may be servers or software applications used by print shop customers. Clients 110-112 submit print data and job tickets that describe how the print data will be processed to interface 121. Workflow server 120 generates custom workflows for incoming print jobs, and manages print shop resources 130 in accordance with these workflows. The custom workflows are generated based on rules for the print shop, a job ticket of the print job, and activities available at the print shop.

Clients 110-112 may serve banks, credit card companies, or other customers having printing and document delivery needs (e.g., monthly bank statements, monthly credit card bills, etc.). Clients 110-112 may also serve customers with digital printing and publishing needs (e.g., needs for e-mail services, web publishing services, and others). Information describing the services requested by the customer may be included in job tickets sent by clients 110-112.

Print shop resources 130 include the devices and components of the print shop that are used to perform print shop activities. For example, print shop resources 130 may include personnel, printers, post-printing machinery, e-mail or web publishing servers, media, ink, firmware versions for print shop devices, and others. Print shop resources 130 may exist within the confines of the print shop itself, or may comprise off-site devices and functional components managed by workflow server 120. The print shop resources 131-134 illustrated in FIG. 1 are merely examples of the wide variety of print shop resources 130 that may be provided. For example, print shop resources 130 may include printing system 131 for transforming print data onto a suitable printable medium, such as paper. Other resources may include e-mail server 132 for generating e-mails, web host 133 for generating and hosting web pages or other internet content, and distribution system 134 for packaging and shipping printed documents.

While in operation, workflow server 120 identifies available activities that may be performed by print shop resources 130. For example, when print shop resources 130 include e-mail server 132, available activities may include generating e-mails, scheduling times to send e-mails, and selecting e-mail recipients. Activities may be associated with a category or type of resource (e.g., personnel, printers, servers) and may also be associated with specific named print shop resources (e.g., Susan, printing system 131, e-mail server 132).

Innumerable print shop activities may be defined, and certain print shop activities may be logically related with each other so that they have order and dependency relationships (e.g., a post-printing activity such as hole punching may depend upon the print data being successfully printed). A print shop operator may prioritize activities (e.g., to ensure that billing is the last activity performed), and may make certain activities required (e.g., billing may be required for every print job that enters the system). Furthermore, certain activities may be required, altered, or made optional based upon specific clients, customers, or information in a job ticket of the print job (e.g., customer service requests, multimedia parameters, size of the print data, format of the print data, etc.). For example, thank-you letters may be sent to high value or long-term customers, while credit checks may be performed upon new customers. The logical relationships of print shop activities are hereinafter referred to as "print shop rules" or "rules." In addition to printing activities, rules may regulate non-printing activities (e.g., billing, shipping, document review, multimedia/digital/internet activities, credit checks, etc.). In order to aid an operator of the print shop in managing rules and activities, a Graphical User Interface (GUI) 122 is provided for generation and manipulation of activities and rules. Workflow server 120 stores rules for the print shop in memory 123.

Once rules and activities have been defined, workflow generator 124 is operable to generate a workflow for a print job of a customer. Workflow generator 124 generates the workflow based on information in a job ticket of the print job (e.g., customer service requests for printing or multimedia activities, the size of a print job, etc.) and the rules (e.g., the rules for the customer). The available activities are dynamically scheduled into the customized workflow to define an ordered set of activities to perform (including, for example, activities that run in parallel). Custom workflows are not merely assigned from a predefined workflow template, but rather are generated "from scratch" depending upon available activities at the print shop. For example, custom workflows may not even exist for a print job until after the print job is received at workflow server 120. The workflow comprises an ordered set of print shop activities, and is arranged to conform with the print shop rules (e.g., the rules defined for the customer). To determine an activity to place at a location in the workflow, workflow generator 124 filters the available activities based upon a job ticket of the print job and the rules for the print job. Information in a job ticket of the print job may include print data and multimedia characteristics (e.g., e-mail addresses, print data size, print data format, etc.), as well as services requested by the customer (e.g., three copies, in black and white, delivered in one week). In one embodiment, workflow generator 124 analyzes the services requested by the customer to generate selection criteria for the activities. The rules may also provide criteria for choosing from the set of available activities of the print shop. For example, a rule may require a credit check activity to be performed for new customers. Using the job ticket and the rules for the customer, the available activities can be placed at specific locations in order to generate a workflow.

To aid workflow generator 124 in dynamically scheduling activities in the workflow, print shop activities may be associated with information that describes their resources, dependencies, and priorities. Rules may alter the dependency, priority, and resource information for print shop activities under specific conditions. Resource information describes the resources used for a specific activity. Dependency information describes activities that are performed before the current activity. Priority information describes where the activity would be placed in the second workflow if no dependency relationships existed between activities. Workflow generator 124 positions related activities in the second workflow based upon their resource usage, dependencies, and priority.

Resource manager 125 of workflow server 120 analyzes and processes the generated workflow by directing print shop resources 130 to perform the activities defined by the workflow for a given print job. In one embodiment, resource manager 125 identifies activities that relate to specific print shop resources 131-134 (e.g., the activity "e-mail the client a printing status report" may relate to e-mail server 132), and instructs the specific resources to perform the identified activities. Resource manager 125 may further receive feedback from print shop resources 130 (e.g., information indicating that an activity has successfully completed).

Thus, while in operation, workflow server 120 receives and processes incoming print jobs from clients 110-112. Workflow server 120 determines the customer's service requests, and dynamically generates (i.e., "from scratch") a workflow of activities to perform in order to achieve the requested services for the customer while complying with the rules of the print shop. These dynamically generated workflows are customized to each incoming job based upon rules defined for the print shop. Workflow server 120 then initiates processing of the workflow for each job with print shop resources 130.

FIG. 2 is a block diagram illustrating an installation package 200 in communication with a computer 240 and print shop resources 130 in an exemplary embodiment. Installation package 200 typically resides on a physical storage medium (e.g., solid-state drives, hard disks, DVD, CD, Blu-Ray™ discs, etc.) from which it may be loaded onto a print shop device such as a computer. Installation package 200 comprises interface 210, templates 220, and installer 230. Templates 220 include multiple installation templates that may each be used to direct the installation process. Each template may be used to generate a different dialogue during the installation process for workflow server 120. Therefore, each template describes a different set of print shop resources that are expected to be found at a specific type of print shop (e.g., based on print shop size/volume, print job services, print shop customers, etc.). Each template also omits print shop resources from the installation dialogue, depending on the category of print shop. Installer 230 is operable to install workflow server 120 onto a computer 240 so that workflow server 120 may manage workflows for the print shop. Installer 230 presents an installation dialogue to a user via interface 210 in order to facilitate the installation process, and receives input that describes the print shop environment. Based on this information, installer 230 decides what portions of software to extract or copy onto computer 240 during the installation process in order to enable workflow server 120 to communicate with print shop resources 130.

Further details of the operation of installation package 200 will be discussed with regard to FIG. 3. Assume, for this embodiment, that a user in a print shop begins the installation process by activating installation package 200 at a work station of the print shop and requesting the installation of workflow server 120.

Figure 3:
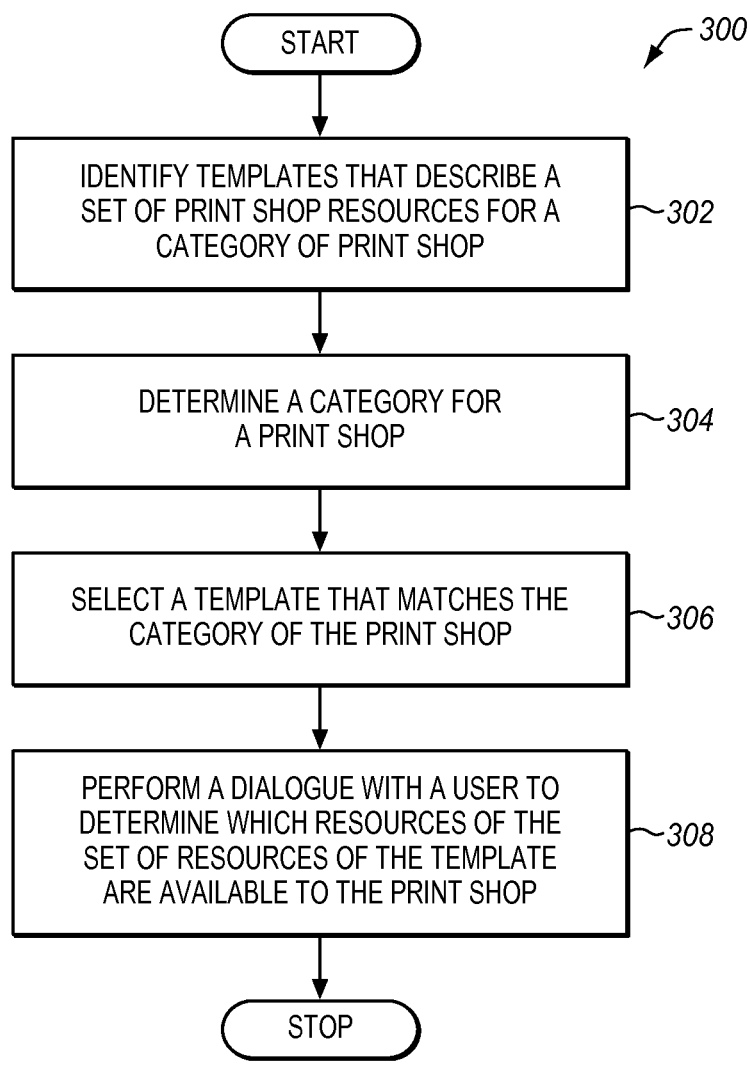
FIG. 3 is a flowchart illustrating a method for installing software for a workflow server for a print shop in an exemplary embodiment.

FIG. 3 is a flowchart illustrating a method for installing software for a workflow server for a print shop in an exemplary embodiment. The steps of method 300 are described with reference to installation package 200 of FIG. 2, but those skilled in the art will appreciate that method 300 may be performed in other systems. The steps of the flowcharts described herein are not all inclusive and may include other steps not shown. The steps described herein may also be performed in an alternative order.

In step 302, installation package 200 identifies templates 220 stored in a memory so that the installation process may begin. The templates each describe options, queries, and/or setup questions (herein after, the various combinations thereof will be referred to as "queries") used by an installation dialogue to determine the exact nature of the print shop environment that workflow server 120 will be installed into. Each template is tailored to a category of print shop, based upon the customers served by the print shop or the type of services offered by the print shop (e.g., educational printing services, web-to-print printing services, etc.), the size of the print shop, or other print shop characteristics. Each template may describe a different set of print shop resources that are expected to be found at a category of print shop (e.g., an exemplary template may describe "binders," "staplers," and "printers," but not "e-mail systems"). Each template also omits queries for print shop resources that are not expected to be found at the category of print shop. The templates may exclude print shop resources by omission, and in one embodiment the templates may expressly indicate the print shop resources (or types of resources) that are excluded from the installation dialogue. By omitting queries regarding certain print shop resources, each template narrows the potential universe of installation options and significantly reduces the amount of time taken to determine the resources that are actually available in a given print shop. Thus, with certain print shop resources excluded from the installation process, an installation dialogue may be reduced to ask a user only tens of questions instead of thousands.

In step 304, installer 230 determines a category for the print shop. Each category is associated with a different set of print shop resources. For example, a "large print shop" category may be expected to include high-volume continuous-form printing systems, while a "small print shop" category may not. In one embodiment, installation package 200 displays a set of print shop categories to a user, and awaits the user's selection of a category. In another embodiment, installer 230 determines the category for the print shop by parsing a file describing the capabilities of the print shop and comparing these capabilities to different print shop categories, by analyzing an exemplary job ticket for the print shop to determine the activities typically performed by the print shop, by parsing data that describes the print shop environment and finding the category that most closely matches the print shop environment, or by other automated means.

The category of the print shop may be based upon the customers served by the print shop, or may be based upon the general layout and function of the print shop. For example, print shops that utilize workflow systems may each fall into a different market segment.

There are several classic market segments for print shops. "In-plant" print shops are shops that are part of a company whose main business is not printing. In-plant shops serve the needs of that company only. "Commercial printers" are print shops that serve external customers. Typically when talking about commercial printers, people think of shops that mainly serve business customers. Commercial printers can do a large variety of jobs, from high quality printing (magazines, marketing materials, etc.), to direct mail ("junk" mail), books, booklets, manuals, etc. "Quick printers" are technically a subsegment of commercial printers, but are sometimes viewed as a segment of their own. They serve small businesses and individual customers, and are generally known as "copy shops." A customer may walk in with a document that needs printed and bound, give it to a copy shop employee, get a quote, and come back next day to pick up the paper and pay. "Transactional shops" print mainly transactional data (bills, invoices, statements, checks, etc.). Some of the transactional shops are in-plant print shops, and some are commercial (often called "service bureaus").

The bottom line is that the print shop's market segment may influence the available print shop resources of the print shop (e.g., the equipment and software that the print shop will have). For commercial printers, print quality may be very important. For transactional printers, data accuracy and integrity may be very important. Therefore, each type of print shop may use different software/hardware combinations to perform their functions.

In step 306, installer 230 selects an installation template stored in memory that matches the category of the print shop. This selection may be performed based upon input from a user. For example, installer 230 may receive input selecting an installation template via interface 210. The input may comprise a selection of a template based upon a menu, or the input may describe a location at which a template is stored. In one embodiment, installer 230 automatically selects a template that matches the print shop category after the category has been determined.

In step 308, installer 230 performs a dialogue, based upon the selected template, to determine the configuration of the print shop. In particular, the dialogue comprises multiple queries that are provided to the user and responded to by the user. A query may include, for example, a question about whether a print shop resource exists, a question about how a print shop resource is calibrated. Based upon the responses to the queries, installer 230 determines which resources of the set of print shop resources identified by the selected template are actually available to the print shop. During this process, installer 230 excludes queries from the dialogue that relate to print shop resources that are not in the set of resources described by the template. For example, the dialogue may, by default, present options to a user that relate to Web-to-Print applications. However, if the print shop is a small print shop, the template may not include queries regarding this print shop resource. By skipping the installation process for these print shop resources, less time is wasted querying the user about non-existent systems and devices.

The dialogue itself may be performed with the user via interface 210, and interface 210 may comprise a graphical user interface or other system for presenting options to the user and receiving feedback. The queries of the dialogue may be used to determine the hardware and software on which workflow server 120 will be installed, the types of print shop resources at the print shop, the specific print shop resources of the print shop, typical workflow processing methods for the print shop, and others. In one example, the queries of the dialogue are used to determine the make, model, and configuration of devices at the print shop.

Typically, communication with a printer is performed over an Ethernet (TCP/IP) connection, although other methods may be used (e.g., via a wireless connection, a USB or Firewire™ cable connection, etc.). Each printing device may use different protocols for communication. For device monitoring and configuration information, a device may offer PJL backchannel data, PS backchannel data, IPP, SNMP, JDF/JMF (a subset of). For job submission, a device may offer raw TCP/IP, LPR/LPD, IPP, JDF/JMF over the connection (e.g., Ethernet, USB, SCSI, wireless, etc.). Wired is most common, though some lower end production devices support wireless as well (mainly because they are sold both as production devices as well as office devices).

As soon as the type of a device is determined, installer 230 may ask the user for a method of contacting it. The method of contacting the device may include information describing the port used to connect to the device, and/or the protocol used by the device. In one embodiment, once a port has been determined for the device, installer 230 looks up information in memory in order to determine the communication protocols used by the device. As input is received from the user, installer 230 may determine the files, libraries, extensions, and functions that would be used by workflow server 120 to generate and manage workflows at the print shop.

Once resources available to the print shop have been identified, installer 230 extracts software for workflow server 120 onto a computer at the print shop. In this process, various libraries, extensions, files and functionality may be unpacked from installer 230 and loaded onto computer 240. Extracting may include uncompressing the software, unencrypting the software, copying the software to the computer, or other related data operations. The combination of software components integrated into workflow server 120 depends upon the nature of the resources at the print shop. During this process, installer 230 may integrate different functional software modules into workflow server 120 that are each operable to communicate with a different type of print shop resource. The modules incorporated into workflow server 120 depend upon the print shop resources 130 available at the print shop and identified by installer 230. When different combinations of modules are selected to integrate into workflow server 120, workflow server 120 can communicate with different sets of available print shop resources 130.

By implementing the above steps, the space taken by workflow server 120 on computer 240 can be optimized, because workflow server 120 does not need to include logic or software for communicating with resources that do not exist at the print shop. Additionally, the installation time for workflow server 120 may be beneficially reduced because only a reduced set of the total potential universe of print shop resources 130 will be presented to the user at the dialogue. Additionally, once workflow server 120 has been installed, it may generate workflows for incoming print jobs "from scratch" by dynamically assembling sets of activities into workflows. Workflow server 120 may also direct the resources of the print shop to carry out the activities of a workflow for an incoming job.

EXAMPLES

In the following examples, additional processes, systems, and methods are described in the context of an installation package 200 operable to install a workflow server 120 for a print shop environment. FIGS. 4-7 illustrate an example of an installation package shipped to a customer and used to install a workflow server at a print shop.

Figure 4:
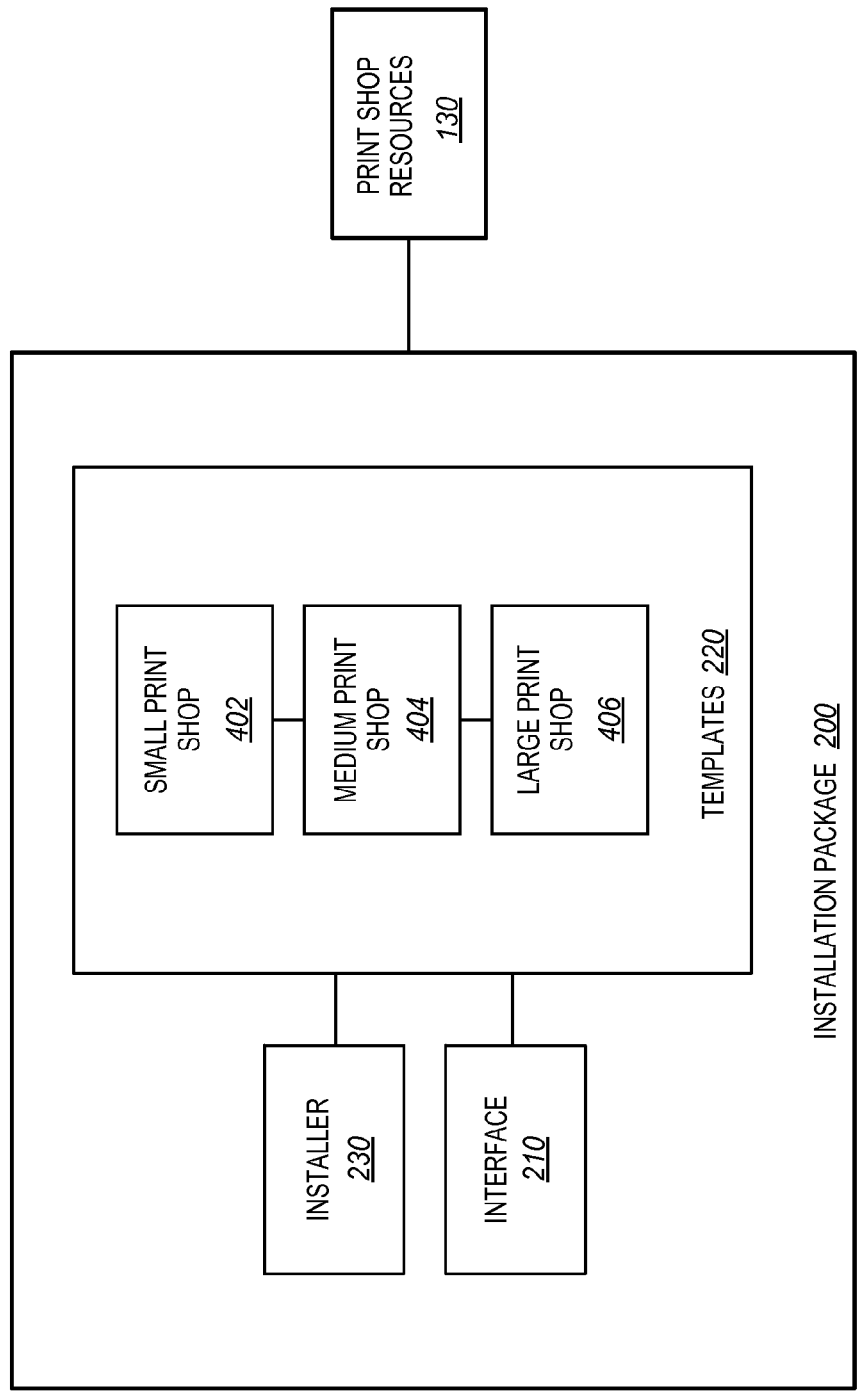
FIG. 4 is a block diagram illustrating templates for installing a workflow server at a print shop.

FIG. 4 is a block diagram illustrating templates for installing a workflow server 120 at a print shop. Assume, for this embodiment, that installation package 200 is loaded onto a compact disc and shipped out to different print shops having different configurations. Because each shop may have a significantly different combination of hardware, software, and personnel, installation package 200 arrives pre-loaded with many different templates designed for different categories of print shops. A user loads installation package 200 at a workstation of the print shop, and informs installation package 200 that their print shop is a small print shop. Based upon this information, installer 230 chooses to use small print shop template 402 to carry out the installation process.

Figure 5:
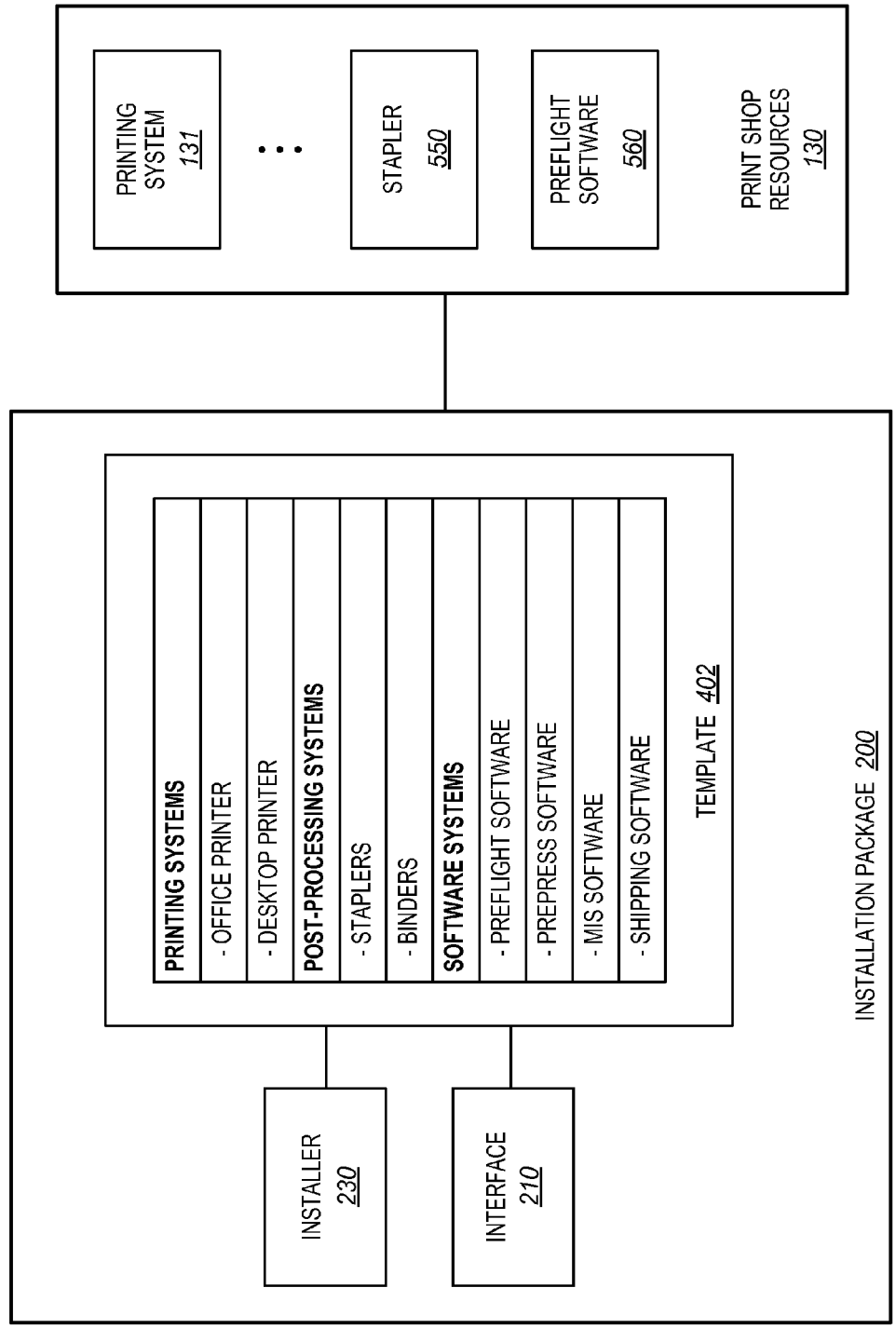
FIG. 5 is a block diagram illustrating a template used to install a workflow server for a print shop in an exemplary embodiment.

FIG. 5 is a block diagram illustrating a "small print shop" template 402 used to install a workflow server 120 for a print shop in an exemplary embodiment. In this example, template 402 includes information describing small printing systems, simple post-processing systems, and print shop software. According to template 402, two potential kinds of printing systems are expected to exist at small print shops (office printers and desktop printers). Additionally, two types of post-processing systems are expected (staplers and binders), and four types of software systems are expected (preflight software, prepress software, MIS software, and shipping software). Based on this information, installer 230 engages in a dialogue to query the print shop user and determine whether each of the expected printing systems, post-processing systems, and software systems of the template actually exist at the print shop. However, because packaging systems are not listed as being expected, the installation dialogue does not include queries for systems at a print shop that would package printed materials for later mailing. Thus, during the installation process, the user of the print shop encounters fewer installation questions than they normally would, thereby expediting the process.

When one of the print shop resources is determined to exist at the print shop, installer 230 acquires information from the template that describes how to communicate with the print shop resource (e.g., the protocol used by the print shop resource to communicate with the print shop). Based upon this information, installer 230 may activate resource modules that are operable to communicate with the print shop resources. In this example, printing system 131 of the print shop corresponds to an office printer described by template 402, stapler 550 corresponds to a stapler of template 402, and preflight software 560 corresponds to preflight software of template 402.

Figure 6:
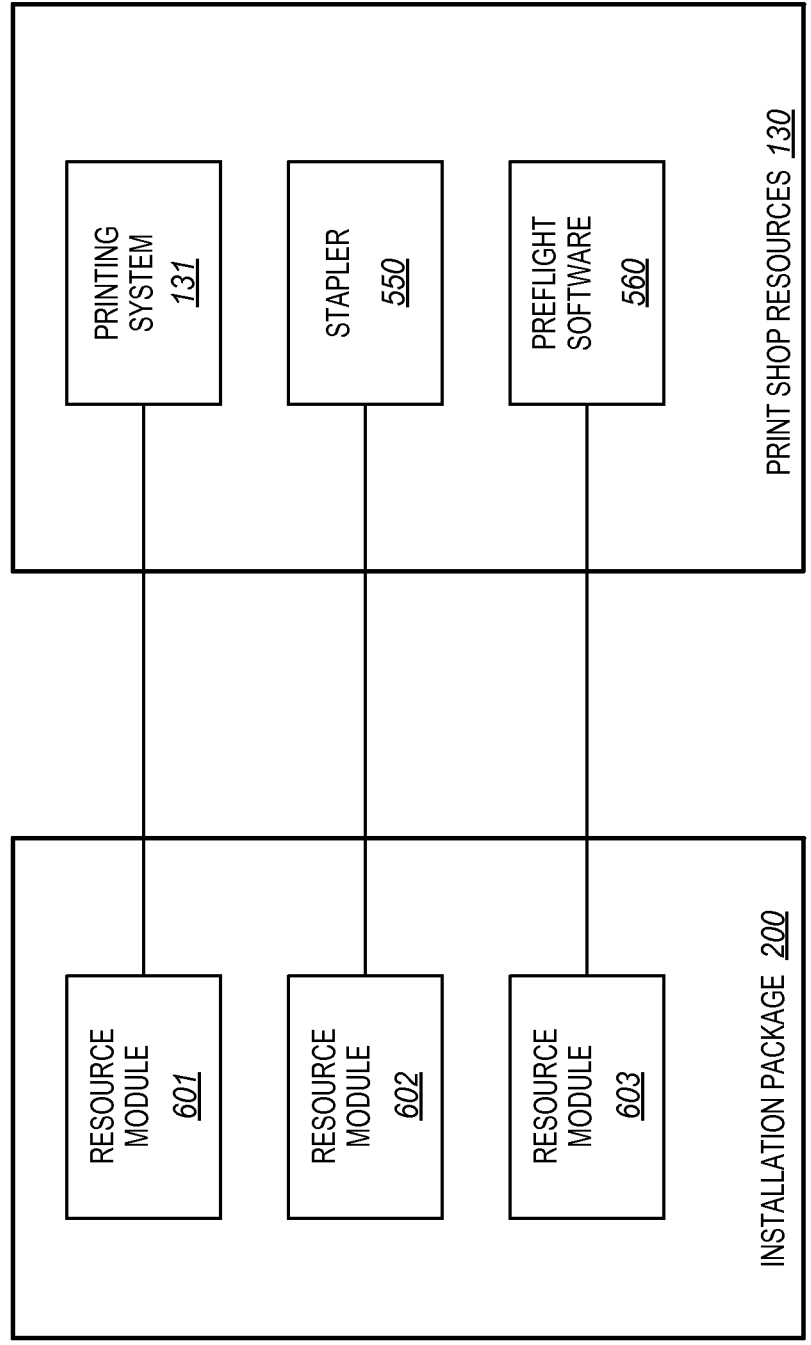
FIG. 6 is a block diagram illustrating modules of an installation package that are used to communicate with print shop resources in an exemplary embodiment.

FIG. 6 is a block diagram illustrating modules 601-603 of installation package 200 that are used to communicate with print shop resources 130 in an exemplary embodiment. According to FIG. 6, resource modules 601-603 are integrated into installation package 200. Each module is configured to establish communications with a print shop resource, based upon input received at installation package 200 that describes how to initiate contact with the print shop resource. Resource modules 601-603 are operable to establish contact with print shop resources 130 by communicating with the resources in their native language or protocol. In this embodiment, module 601 initiates communications with printing system 131, module 602 initiates communications with stapler 550, and module 603 initiates communications with preflight software 560. Installer 230 may decide to incorporate modules 601-603 into workflow server 120 if the modules successfully contact and communicate with the print shop resources at the print shop.

Figure 7:
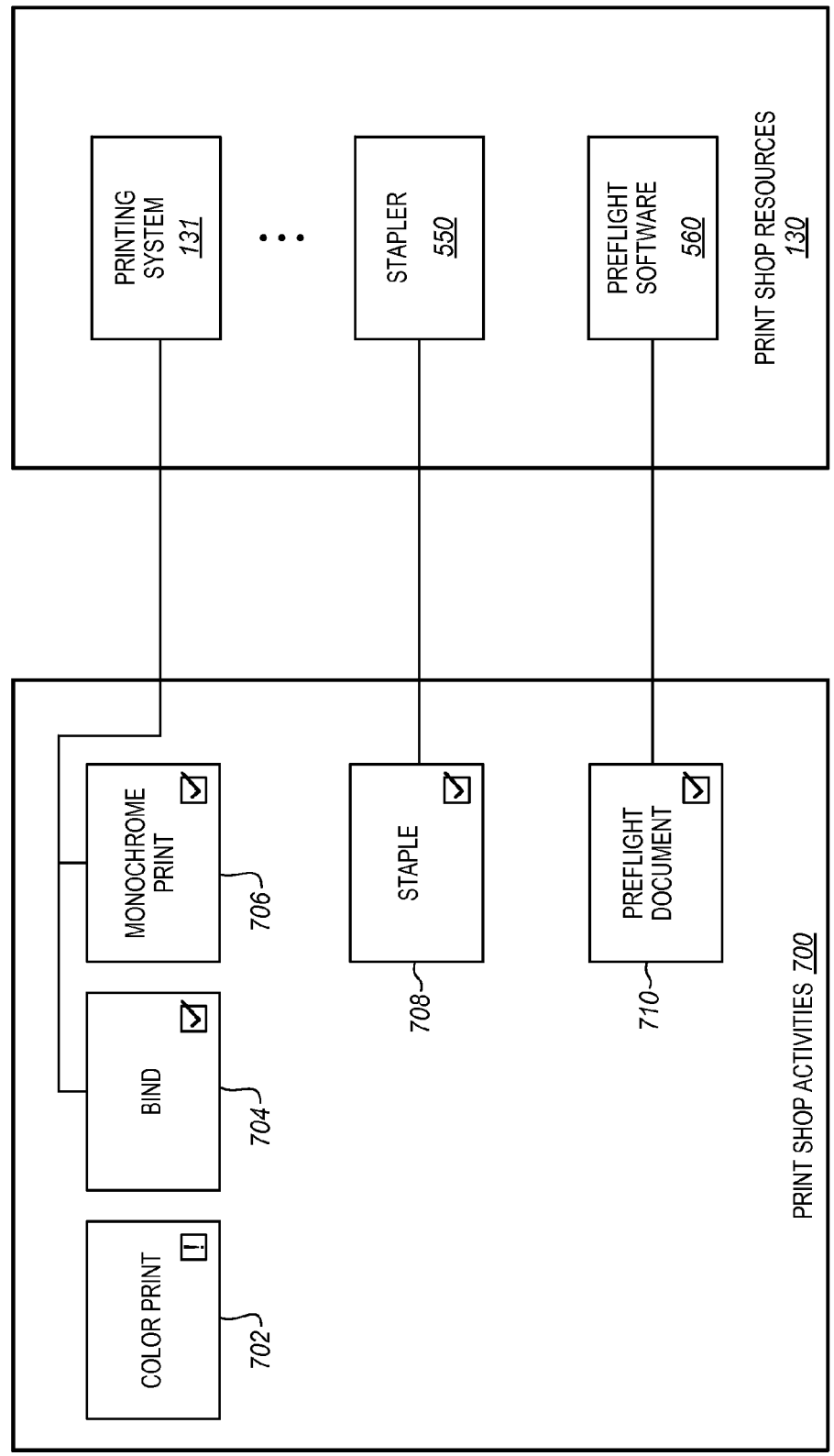
FIG. 7 is a block diagram of print shop activities that are associated with print shop resources in an exemplary embodiment.

Assume, for this embodiment, that each of modules 601-603 successfully establish communications with print shop resources 130. Further, assume that modules 601-603 are integrated into workflow server 120 during the installation process so that workflow server 120 may communicate with print shop resources 130. In FIG. 7, activities for workflow server 120 are associated with print shop resources 130 so that workflow server 120 may direct print shop resources 130 to perform print shop activities.

FIG. 7 is a block diagram of print shop activities 700 that are associated with print shop resources in an exemplary embodiment. This association process typically occurs during the installation process as the workflow server software is being extracted at step 310 of FIG. 3 above. During this process, print shop resources 130 may be linked to activities (e.g., "print," "bind," "send e-mail," etc.) based upon the capabilities of the print shop resources. For example, a printing system capable of printing, binding, and stapling would be associated with activities for printing, binding, and stapling. In this fashion, when workflow generator 124 creates a workflow that includes a printing activity, it may direct the printing system to perform the activity. Multiple activities may be linked with each print shop resource, and multiple print shop resources may be linked with each activity. For example, an activity for receiving a response from a customer may allow for the response to be received via an e-mail server, a telephone system, print shop personnel, and other print shop resources.

Associating a print shop activity with a print shop resource may include associating the activity in memory with identifiers for print shop resources that are capable of performing the activity. When resources are linked to activities, workflow server 120 may quickly look up the print shop resources 130 that are capable of performing each activity in memory. In this embodiment, print shop activities 700 are stored in memory 123 of workflow server 120, and include printing activities 702-706, stapling activity 708, and preflight activity 710. Printing system 131 supports binding and monochrome printing, but is not capable of color printing. Thus, installer 230 associates bind 704 and monochrome print 706 with printing system 131, and marks these activities in memory 123 as usable to workflow generator 124. However, color print 702 is not associated with a print shop resource because no print shop resource is capable of color printing. Thus, color print 702 is marked as an unusable activity, so that workflow generator 124 will not include the activity in any workflows for incoming print jobs. Stapling activity 708 is supported by stapler 550, so this activity is associated with stapler 550 and marked as usable. In a similar fashion, preflight activity 710 is supported by preflight software 560, so this activity is associated with preflight software 560 and marked as usable. Once the number and nature of usable activities are known to workflow server 120, it may generate workflows for incoming print jobs by selecting and arranging the usable activities of the print shop.

Figure 8:
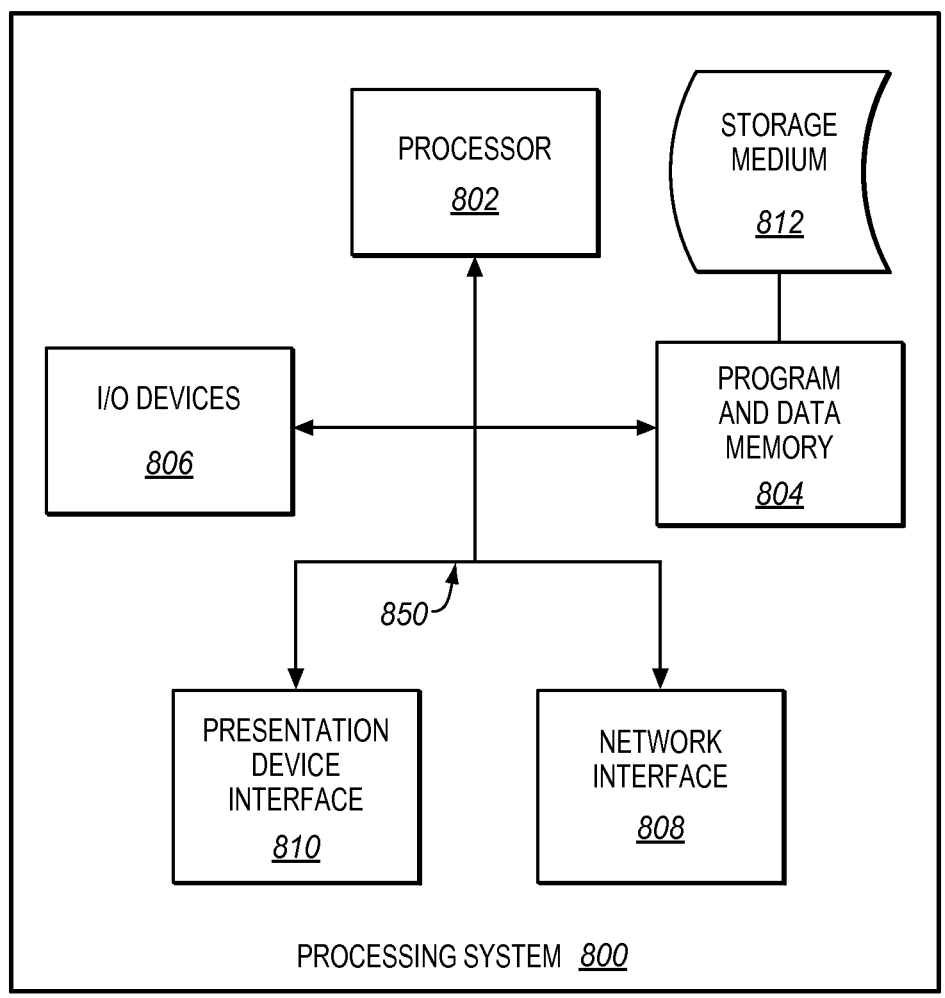
FIG. 8 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of installation package 200 to perform the various operations disclosed herein. FIG. 8 illustrates a processing system operable to execute a computer readable medium embodying programmed instructions to perform desired functions in an exemplary embodiment. Processing system 800 is operable to perform the above operations by executing programmed instructions tangibly embodied on a computer readable storage medium 812. In this regard, embodiments of the invention can take the form of a computer program accessible via the computer-readable medium 812 providing program code for use by a computer or any other instruction execution system. For the purposes of this description, a computer readable storage medium 812 can be anything that can contain or store the program for use by the computer.

The computer readable storage medium 812 can be an electronic, magnetic, optical, electromagnetic, infrared, or semiconductor device. Examples of the computer readable storage medium 812 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

The processing system 800, being suitable for storing and/or executing the program code, includes at least one processor 802 coupled to memory elements 804 through a system bus 850. The memory elements 804 can include local memory employed during actual execution of the program code, bulk storage, and cache memories that provide temporary storage of at least some program code and/or data in order to reduce the number of times the code and/or data are retrieved from bulk storage during execution.

Input/output or I/0 devices 806 (including but not limited to keyboards, displays, pointing devices, etc.) can be coupled to the system either directly or through intervening I/O controllers. Network adapter interfaces 808 may also be coupled to the system to enable the processing system 800 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 810 may be coupled to the system to interface to one or more presentation devices, such as printing systems and displays for presentation of presentation data generated by processor 802.

Although specific embodiments were described herein, the scope of the invention is not limited to those specific embodiments. The scope of the invention is defined by the following claims and any equivalents thereof.

We claim:

1. A system comprising:
installation templates that are each configured for a different category of print shop, wherein each installation template describes a set of print shop resources expected to exist at the category of print shop; and
an installer, loaded onto a non-transitory computer-readable medium, that is operable to install workflow server software on a computer system of a print shop, wherein as part of the installation, the installer is further operable to:
determine a category for the print shop, select an installation template that matches the category for the print shop, perform a dialogue of queries with a user to determine which resources identified by the installation template are available to the print shop, wherein the dialogue excludes queries for print shop resources that are not described by the installation template, and configure the workflow server software based on responses to the dialogue.

2. The system of claim 1, wherein:
the installer is further operable to determine the category for the print shop automatically by identifying capabilities of the print shop.

3. The system of claim 1, wherein:
the installer is further operable to determine the category for the print shop by providing the user multiple options for print shop categories, and receiving input indicating one of the options as the category for the print shop.

4. The system of claim 1, wherein:
the installation templates are categorized based upon a market segment of the print shop.

5. The system of claim 1, wherein:
the installer is further operable to perform the queries of the dialogue to determine whether each print shop resource described by the installation template is available to the print shop.

6. The system of claim 5, wherein:
the installer is further operable to perform the queries of the dialogue to determine communication protocols used by the print shop resources available to the print shop.

7. The system of claim 5, wherein:
the installer is further operable to perform the queries of the dialogue to determine a configuration of each print shop resource available to the print shop.

8. A method comprising:
identifying installation templates that are each configured for a different category of print shop, wherein each installation template describes a set of print shop resources expected to exist at the category of print shop; and
installing workflow server software on a computer system of a print shop, comprising:
determining a category for the print shop;
selecting an installation template that matches the category for the print shop;
performing a dialogue of queries with a user to determine which resources identified by the installation template are available to the print shop, wherein the dialogue excludes queries for print shop resources that are not described by the installation template; and
configuring the workflow server software based on responses to the dialogue.

9. The method of claim 8, further comprising:
determining the category for the print shop automatically by identifying capabilities of the print shop.

10. The method of claim 8, further comprising:
determining the category for the print shop by:
providing the user multiple options for print shop categories; and
receiving input indicating one of the options as the category for the print shop.

11. The method of claim 8, wherein:
the installation templates are categorized based upon a market segment of the print shop.

12. The method of claim 8, further comprising:
performing the queries of the dialogue to determine whether each print shop resource described by the installation template is available to the print shop.

13. The method of claim 8, further comprising:
performing the queries of the dialogue to determine the communication protocols used by the print shop resources available to the print shop.

14. The method of claim 8, further comprising:
performing the queries of the dialogue to determine a configuration of each print shop resource available to the print shop.

15. A non-transitory computer readable medium embodying programmed instructions which, when executed by a processor, are operable for performing a method comprising:
identifying installation templates that are each configured for a different category of print shop, wherein each installation template describes a set of print shop resources expected to exist at the category of print shop; and
installing workflow server software on a computer system of a print shop, comprising:
determining a category for the print shop;
selecting an installation template that matches the category for the print shop;
performing a dialogue of queries with a user to determine which resources identified by the installation template are available to the print shop, wherein the dialogue excludes queries for print shop resources that are not described by the installation template; and
configuring the workflow server software based on responses to the dialogue.

16. The medium of claim 15, wherein the method further comprises:
determining the category for the print shop automatically by identifying capabilities of the print shop.

17. The medium of claim 15, wherein the method further comprises:
determining the category for the print shop by:
providing the user multiple options for print shop categories; and
receiving input indicating one of the options as the category for the print shop.

18. The medium of claim 15, wherein:
the installation templates are categorized based upon a market segment of the print shop.

19. The medium of claim 15, wherein the method further comprises:
performing the queries of the dialogue to determine whether each print shop resource described by the installation template is available to the print shop.

20. The medium of claim 15, wherein the method further comprises:
performing the queries of the dialogue to determine communication protocols used by the print shop resources available to the print shop.

* * * * *